US010358852B2

(12) United States Patent
Wilks et al.

(10) Patent No.: US 10,358,852 B2
(45) Date of Patent: Jul. 23, 2019

(54) DETACHABLE LIFT GATE HINGE COVER ASSEMBLED TO ROOF RAIL

(71) Applicant: Dura Operating, LLC, Auburn Hills, MI (US)

(72) Inventors: Patrick Wilks, Rochester Hills, MI (US); Amer Mansour, West Bloomfield, MI (US); Scott Sharron, LaSalle (CA)

(73) Assignee: DURA OPERATING, LLC, Auburn Hills, MI (US)

( * ) Notice: Subject to any disclaimer, the term of this patent is extended or adjusted under 35 U.S.C. 154(b) by 78 days.

(21) Appl. No.: 15/661,483

(22) Filed: Jul. 27, 2017

(65) Prior Publication Data

US 2019/0032383 A1    Jan. 31, 2019

(51) Int. Cl.
*E05D 11/00* (2006.01)
*E05D 5/02* (2006.01)
*B60R 13/04* (2006.01)

(52) U.S. Cl.
CPC .......... *E05D 11/0054* (2013.01); *B60R 13/04* (2013.01); *E05D 5/0207* (2013.01)

(58) Field of Classification Search
CPC .... E05D 11/0054; E05D 5/0207; B60R 13/04
USPC .................................................... 296/146.11
See application file for complete search history.

(56) References Cited

U.S. PATENT DOCUMENTS

| | | | |
|---|---|---|---|
| 6,142,551 A * | 11/2000 | Ciavaglia | E05F 15/619 296/146.4 |
| 6,769,731 B1 | 8/2004 | Myers et al. | |
| 7,021,698 B2 | 4/2006 | Yamada et al. | |
| 7,669,916 B2 * | 3/2010 | Munenaga | B60J 5/107 296/146.11 |
| 8,979,181 B2 | 3/2015 | Slack et al. | |
| 2013/0234462 A1 | 9/2013 | Coakley et al. | |

* cited by examiner

*Primary Examiner* — Joseph D. Pape
*Assistant Examiner* — Dana D Ivey
(74) *Attorney, Agent, or Firm* — Robert E. Ford; Raymond J. Vivacqua; Steven L. Crane

(57) ABSTRACT

A detachable lift gate hinge cover assembly includes a bracket fixed to a vehicle roof, the bracket including an attachment member having an integrally connected coupling portion. A plate assembly includes a panel having a retention member integrally connected to the panel. The plate assembly when rotated in a first rotation direction aligns the retention member with a clearance opening of the coupling portion allowing insertion of the retention member through the clearance opening to releasably engage a hook shaped end of the retention member with the coupling portion. The plate assembly when positioned in an installed position within a roof hinge pocket of the roof at least partially covers a lift gate hinge attachment area. The plate assembly when rotated in a second rotation direction opposite to the first rotation direction releases the hook shaped end from the coupling portion to release the plate assembly from the installed position.

20 Claims, 4 Drawing Sheets

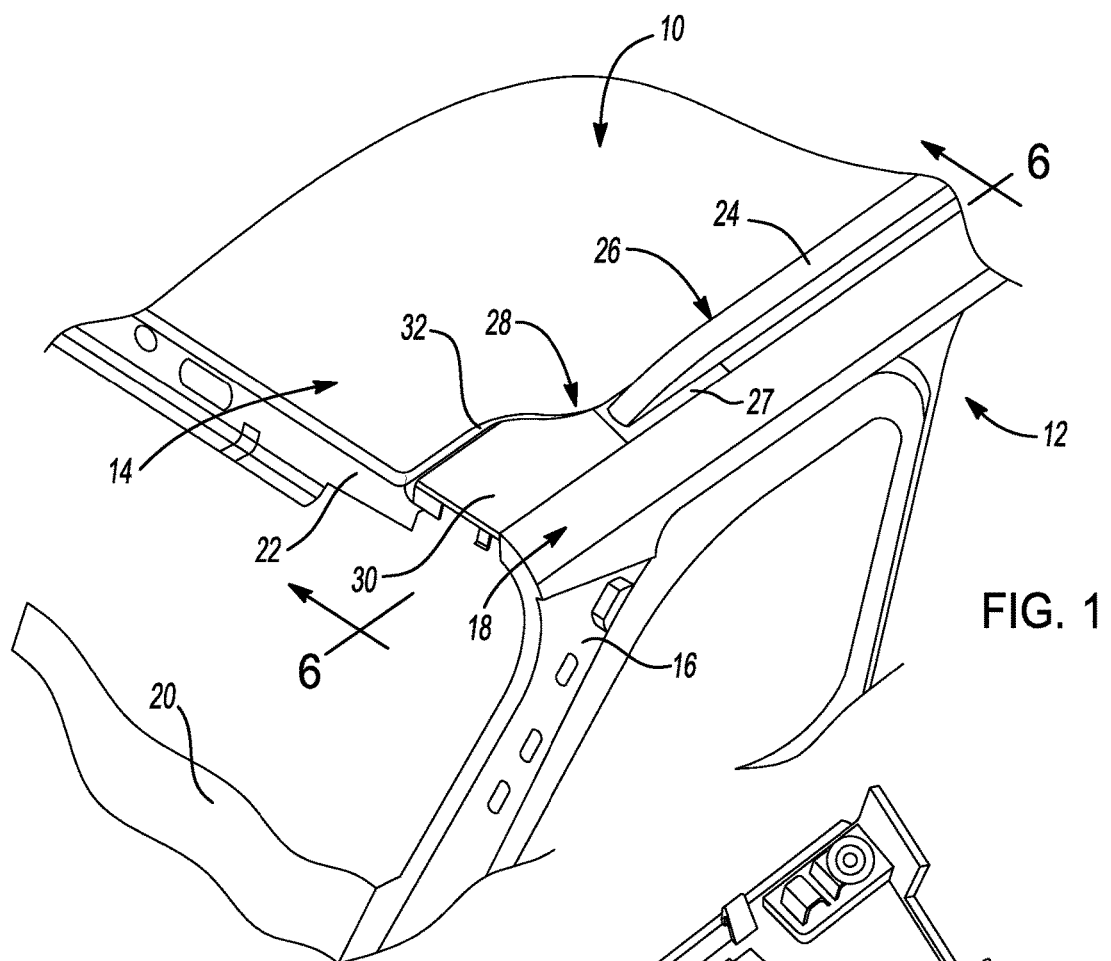
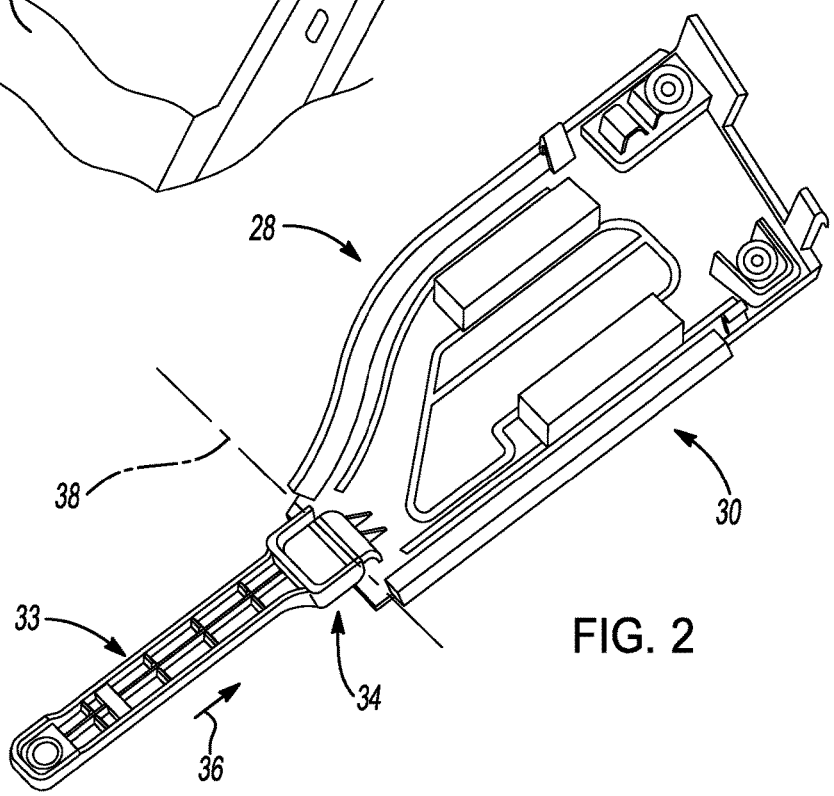

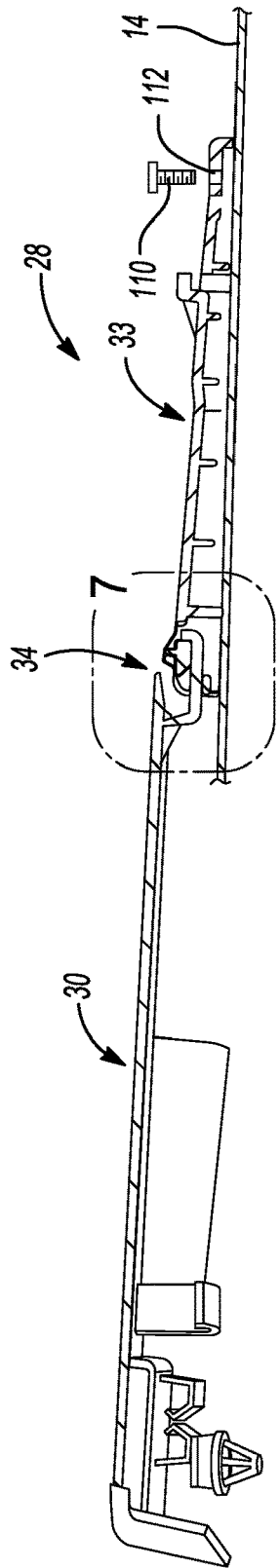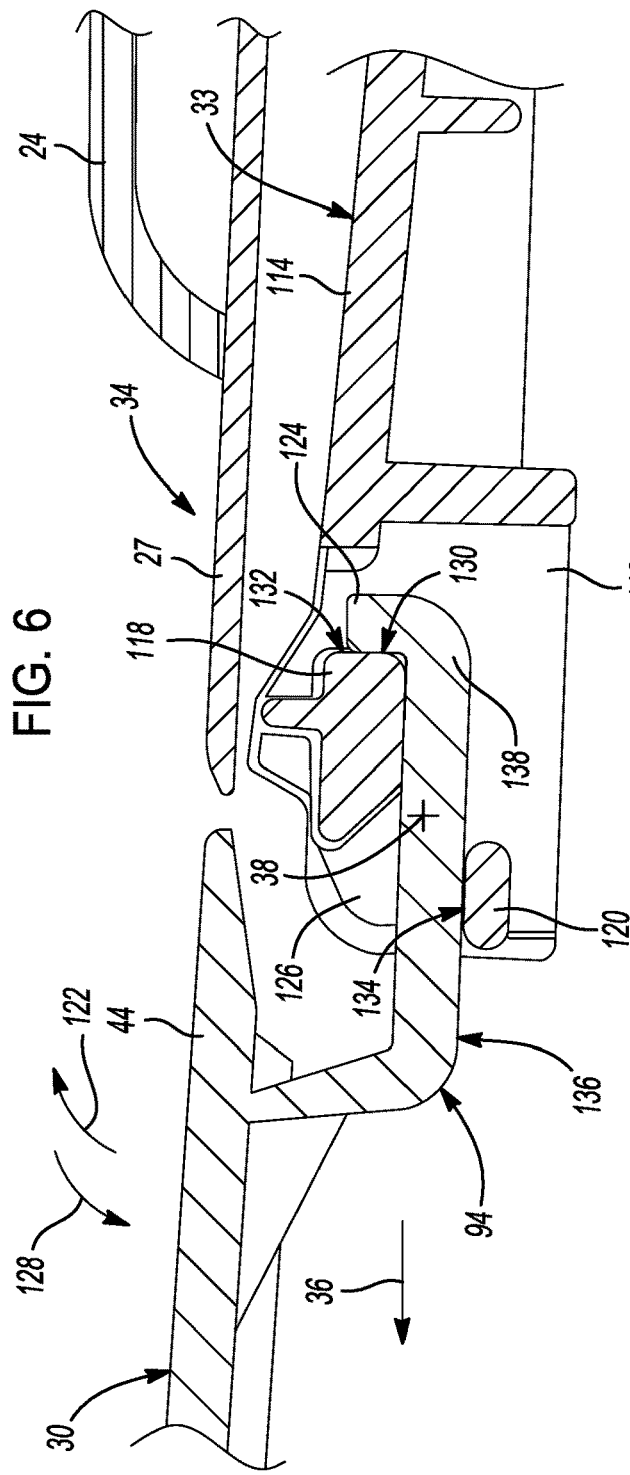

DETACHABLE LIFT GATE HINGE COVER ASSEMBLED TO ROOF RAIL

FIELD

The present disclosure relates generally to automobile vehicle roof rail and lift gate systems and structures.

BACKGROUND

The statements in this section merely provide background information related to the present disclosure and may or may not constitute prior art.

Automobile vehicles commonly include a roof rack assembly which provides side rails fixed to the vehicle roof which provide for storage and extension of roof racks to provide for additional stowage of items on the vehicle roof, for example during extended travel and vacations. Known roof rack assemblies can interact with regions of the vehicle roof where rear lift gates are mounted, typically where lift gate hinges are mounted to the vehicle roof. Known roof rack assemblies therefore include lift gate hinge cover assemblies which are fixed to the roof. The regions of interaction between the roof rack and roof rail systems and the hinges for mounting lift gates commonly create interferences which require substantial time and effort to remove the roof rail components to permit removal of the lift gate hinges for maintenance or replacement. Known roof rack lift gate hinge cover assemblies are also prone to trapping moisture and dirt or leaves, which cause corrosion or discolored discharge at the hinge cover areas.

Thus, while current lift gate hinge cover assemblies achieve their intended purpose, there is a need for a new and improved system and method for installing and allowing removal of lift gate hinge cover assemblies.

SUMMARY

According to several aspects, a detachable lift gate hinge cover assembly includes a bracket positioned within an elongated depression formed in a roof of an automobile vehicle and fixed to each of the roof within the elongated depression and to a trim member positioned outside of the elongated depression. A plate assembly is releasably connected to the bracket, the plate assembly when positioned in an installed position at least partially within and covering a lift gate hinge pocket located rear of the elongated depression.

In another aspect of the present disclosure, the bracket includes an attachment member having an integrally connected coupling portion, the coupling portion including a clearance opening.

In another aspect of the present disclosure, the plate assembly includes a panel having a retention member integrally connected to the panel, the plate assembly when rotated in a first direction of rotation aligning the retention member with the clearance opening of the coupling portion for insertion and removal of the retention member through the clearance opening allowing both connection and disconnection of the plate assembly with the bracket.

In another aspect of the present disclosure, the coupling portion of the bracket further includes a first contact member and a second contact member located within a cavity of the coupling portion.

In another aspect of the present disclosure, the retention member includes a hook shaped end directly contacting the second contact member with the retention member also contacting the first contact member defining the installed position of the plate assembly. An inner face of the hook shaped end directly abuts a first face of the first contact member in the installed position of the plate assembly.

In another aspect of the present disclosure, the hook shaped end of the retention member is oriented substantially perpendicular to a straight portion of the retention member. The first face is oriented substantially perpendicular to a second face of the second contact member, the second face also directly abutted by a flat edge of a straight portion of the retention member in the installed position of the plate assembly.

In another aspect of the present disclosure, the plate assembly includes a panel having: a male clip engaged within an aperture of the roof in an installed position of the plate assembly; and a female clip assembly having a receiving slot capturing a male member extending from the roof in the installed position of the plate assembly.

In another aspect of the present disclosure, the plate assembly includes a panel having: first and second lip seals connected to opposed outer edges of the panel; and at least one anti-vibration foam pad fixed to a planar face of the panel. In an installed position of the panel within the lift gate hinge pocket created in the roof of the automobile vehicle the first lip seal directly contacts a first curved wall of the roof within the trough, and the second lip seal directly contacts an oppositely facing second curved wall of the roof within the trough, with the at least one anti-vibration foam pad positioned between a planar plate section of the roof within the trough and the plate assembly.

In another aspect of the present disclosure, the trim member defines a molding at least partially covering the elongated depression.

In another aspect of the present disclosure, the trim member defines an end portion of a roof rail.

According to several aspects, a detachable lift gate hinge cover assembly includes a bracket fixed to a roof of an automobile vehicle, the bracket including an attachment member having an integrally connected coupling portion. A plate assembly includes a panel having a retention member integrally connected to the panel. The plate assembly when rotated in a first direction of rotation aligns the retention member with a clearance opening of the coupling portion allowing insertion of the retention member through the clearance opening of the coupling portion to releasably engage a hook shaped end of the retention member with the coupling portion. The plate assembly when positioned in an installed position within a roof hinge pocket of the roof at least partially covers a lift gate hinge attachment area. The plate assembly when rotated in a second direction of rotation opposite to the first direction of rotation releases the hook shaped end from the coupling portion to release the plate assembly from the installed position.

In another aspect of the present disclosure, the plate assembly includes a male clip engaged within an aperture of the roof in the installed position of the plate assembly.

In another aspect of the present disclosure, the plate assembly includes a female clip assembly having a first locating, minimally deflecting prong and an opposed second maximally deflecting prong defining a receiving slot therebetween, the receiving slot capturing a male member extending from the roof to retain the plate assembly in the installed position.

In another aspect of the present disclosure, the plate assembly includes cross-car first and second locating members oppositely facing with respect to each other, the cross-car first and second locating members elastically deflecting to frictionally contact opposed walls of the roof hinge pocket of the roof, thereby providing side-to-side alignment of the plate assembly in opposed directions and to provide position retention of the plate assembly within the roof hinge pocket.

In another aspect of the present disclosure, the plate assembly includes a molded clip integrally connected to the plate assembly having a third locating member oriented perpendicular to an orientation of both the first and second locating members.

In another aspect of the present disclosure, the bracket when fixed to the roof of the automobile vehicle is positioned substantially underneath a portion of a roof rack assembly.

In another aspect of the present disclosure, the bracket is fixed to the roof using at least one fastener extending through an aperture created in the bracket.

According to several aspects, a detachable lift gate hinge cover assembly includes a bracket fixed to a roof of an automobile vehicle and positioned substantially underneath a portion of a roof rack assembly. The bracket includes an attachment member having an integrally connected coupling portion and a clearance opening. A plate assembly includes a retention member with a hook shaped end. The plate assembly when rotated in a first direction of rotation aligns the retention member with the clearance opening of the coupling portion allowing insertion of the retention member through the clearance opening to releasably engage the hook shaped end of the retention member with the coupling portion. The plate assembly after rotation in the first direction of rotation is positioned in an installed position within a roof hinge pocket of the roof and at least partially covering a lift gate hinge attachment area. The plate assembly when rotated in a second direction of rotation opposite to the first direction of rotation releases the hook shaped end from the coupling portion to release the plate assembly from the installed position.

In another aspect of the present disclosure, the plate assembly includes a panel having: a male clip engaged within an aperture of the roof in the installed position of the plate assembly; a female clip assembly having a receiving slot capturing a male member extending from the roof in the installed position of the plate assembly; and opposed cross-car first and second locating members elastically deflecting to frictionally contact opposed walls of the roof hinge pocket in the installed position of the plate assembly.

In another aspect of the present disclosure, when the hook shaped end of the retention member is engaged with the coupling portion the plate assembly is rotatable about an axis of rotation with respect to the bracket.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a top right perspective view looking forward of a detachable lift gate hinge cover assembly according to an exemplary embodiment;

FIG. 2 is a bottom left perspective view of the detachable lift gate hinge cover assembly of FIG. 1;

FIG. 6 is a cross sectional end elevational view taken at section 6 of FIG. 1; and FIG. 7 is a cross sectional end elevational view of area 7 of FIG. 6.

DETAILED DESCRIPTION

Figure 3:
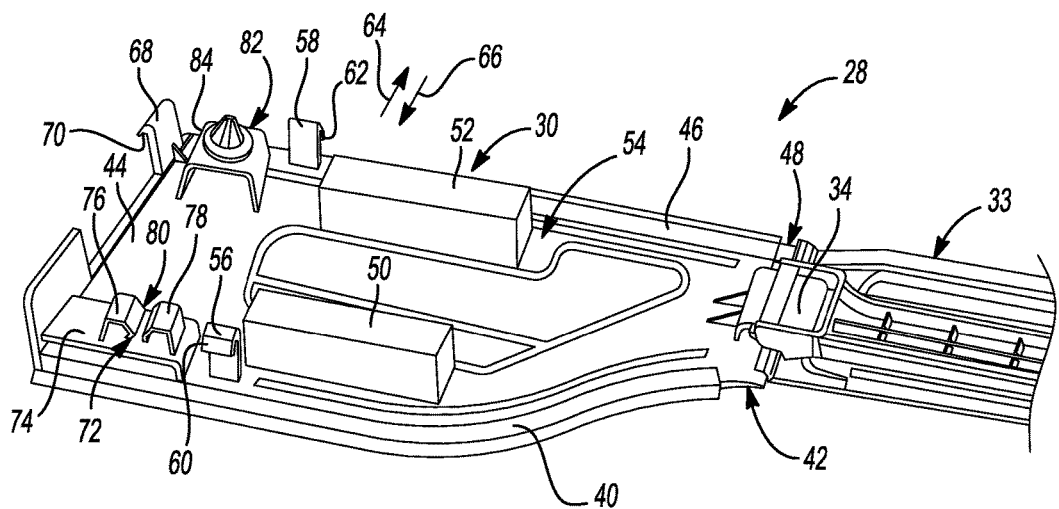
FIG. 3 is a bottom left perspective view of the detachable lift gate hinge cover assembly of FIG. 1.

The following description is merely exemplary in nature and is not intended to limit the present disclosure, application, or uses.

Referring to FIG. 1, a motor vehicle 10 includes a vehicle body 12 having a roof 14 connected to body structural items such as one or more body pillars 16 to structurally support one or more doors (not shown). A body panel 18 can be used to structurally connect the roof 14 to the body pillars 16. A rear lift gate 20 (only partially shown) is rotatably connected to a structural member 22 of the roof 14. A roof rack assembly 24 (having a right side portion shown, and a left side portion not shown) is connected to the roof 14 and is positioned partially within an elongated depression 26 formed between the roof 14 and the body panel 18. A trim member 27 is provided to cover a portion of the elongated depression 26 and is connected to and defines an end portion of the roof rack assembly 24.

A detachable lift gate hinge cover assembly 28 of the present disclosure is used as mirror image assemblies in two locations (left hand and right hand) positioned at a rear of the roof 14, having a first portion positioned between the roof rack assembly 24 and the rear lift gate 20 and having a second portion positioned between the roof rack assembly and the trim member 27. The following discussion of a right hand assembly applies equally to a left hand assembly (not shown), which will therefore not be further discussed herein. A plate assembly 30 of the detachable lift gate hinge cover assembly 28 defines the first portion positioned between the roof rack assembly 24 and the rear lift gate 20, and is positioned partially within an expanded width rear trough portion 32 defining a roof hinge pocket located rear of the elongated depression 26, and in an installed position shown covers hinge structure (not shown) which rotatably connects the rear lift gate 20 to the structural member 22 of the roof 14. The second portion of the detachable lift gate hinge cover assembly 28 is connected to the roof 14 and is also connected to a trim member 27 of the roof rack assembly 24 as will be described in greater detail in reference to FIGS. 6 and 7. To promote maintenance of components associated with the rear lift gate 20 and complete removal of the rear lift gate 20 if necessary, the plate assembly 30 of the detachable lift gate hinge cover assembly 28 is releasably connected.

Referring to FIG. 2 and again to FIG. 1, the plate assembly 30 is releasably coupled to a bracket 33 using a coupling portion 34. The coupling portion 34 when connecting the bracket 33 to the plate assembly 30 normally prevents direct release of the plate assembly 30 in a release direction 36. To assemble the plate assembly 30 to the bracket 33, the plate assembly 30 is rotatable about an axis of rotation 38 as will be described in greater detail in reference to FIG. 7.

Referring to FIG. 3 and again to FIGS. 1 and 2, the plate assembly 30 includes multiple features to assist in connecting and sealing the plate assembly 30 to the roof 14 of the vehicle body 12. These features include a first lip seal 40 fixed to a first outer edge 42 of a polymeric material panel 44 of the plate assembly 30, and a second lip seal 46 fixed to a second outer edge 48 of the panel 44, the first outer edge 42 being positioned oppositely directed with respect to the second outer edge 48. A first anti-vibration foam pad 50 and a second anti-vibration foam pad 52 are each fixed, for example using an adhesive to a planar face 54 of the panel 44.

Elastically deflectable first and second cross-car locators 56, 58 are integrally connected to the panel 44 for example when molding the panel 44. The first cross-car locator 56 includes a first locating member 60, and the second cross-car locator 58 includes a second locating member 62, with the first and second locating members 60, 62 oppositely facing with respect to each other. The cross-car first and second locating members 60, 62 elastically deflect to frictionally contact opposed walls of the rear trough portion 32 of the roof 14 as shown in FIG. 1, and individually deflect to provide side-to-side alignment in opposed directions 64, 66 and to thereby provide position retention of the plate assembly 30. A molded clip 68 integrally connected to the panel 44 includes a third hook member 70 oriented perpendicular to the orientation of both the first and second hook members 60, 62. The molded clip 68 releasably attaches the plate assembly 30 to a trough hider (not shown) provided with the rear lift gate 20 when the rear lift gate 20 is in a closed position.

Figure 5:
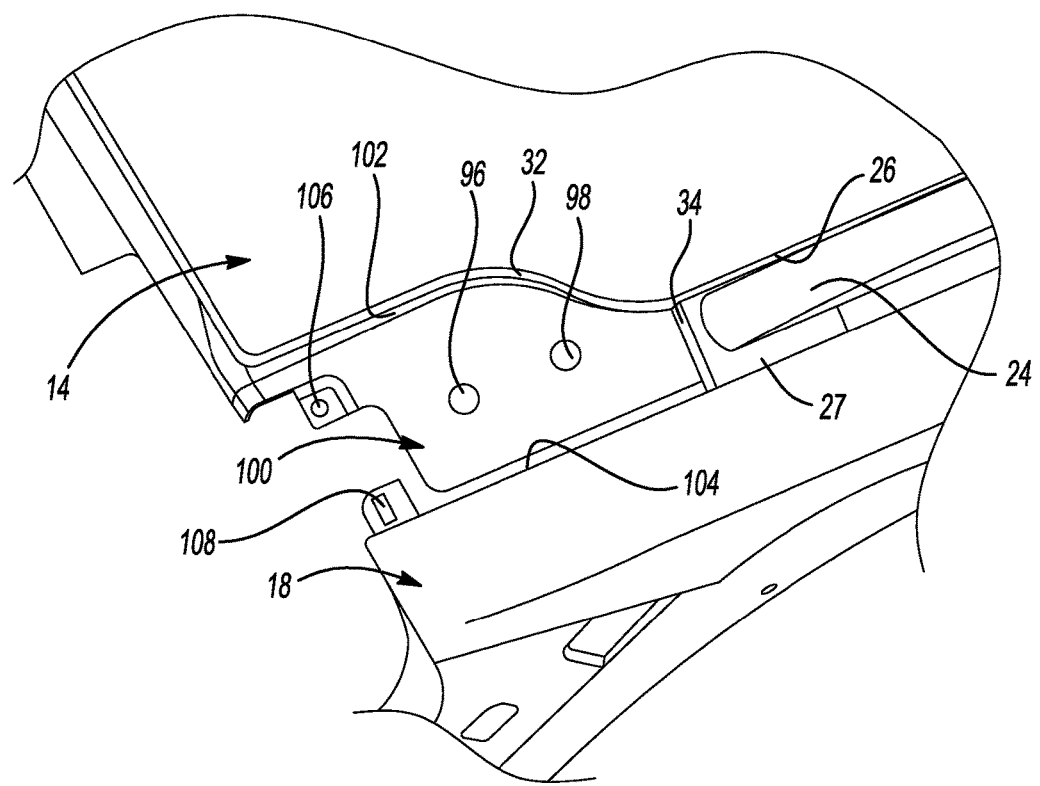
FIG. 5 is a top right perspective view similar to FIG. 1 with the plate assembly removed for clarity.

The plate assembly 30 further includes a female clip assembly 72 used to frictionally connect the plate assembly 30 to the roof 14. The female clip assembly 72 is integrally connected to a raised platform 74 also integrally connected to the panel 44. The female clip assembly 72 includes a first minimally deflecting prong 76 and a second maximally deflecting prong 78 positioned in opposed, facing relationship to each other, thereby creating a receiving slot 80 therebetween. Inn use, the first minimally deflecting prong 76 deflects less than the second maximally deflecting prong 78. A male member (shown and described in reference to FIG. 5) connected to the roof 14 enters the receiving slot 80 and is frictionally gripped by the first and second deflecting prongs 76, 78 to releasably retain the plate assembly 30 to the roof 14 using a biasing force of the oppositely deflected first and second deflecting prongs 76, 78. A male clip 82 such as a W-clip is frictionally engaged in a raised deck portion 84 of the panel 44. The male clip 82 enters an aperture (shown in reference to FIG. 5) created in the roof 14 within the rear trough portion 32 to provide an additional releasable, frictional engagement of the panel 44 to the roof 14.

Figure 4:
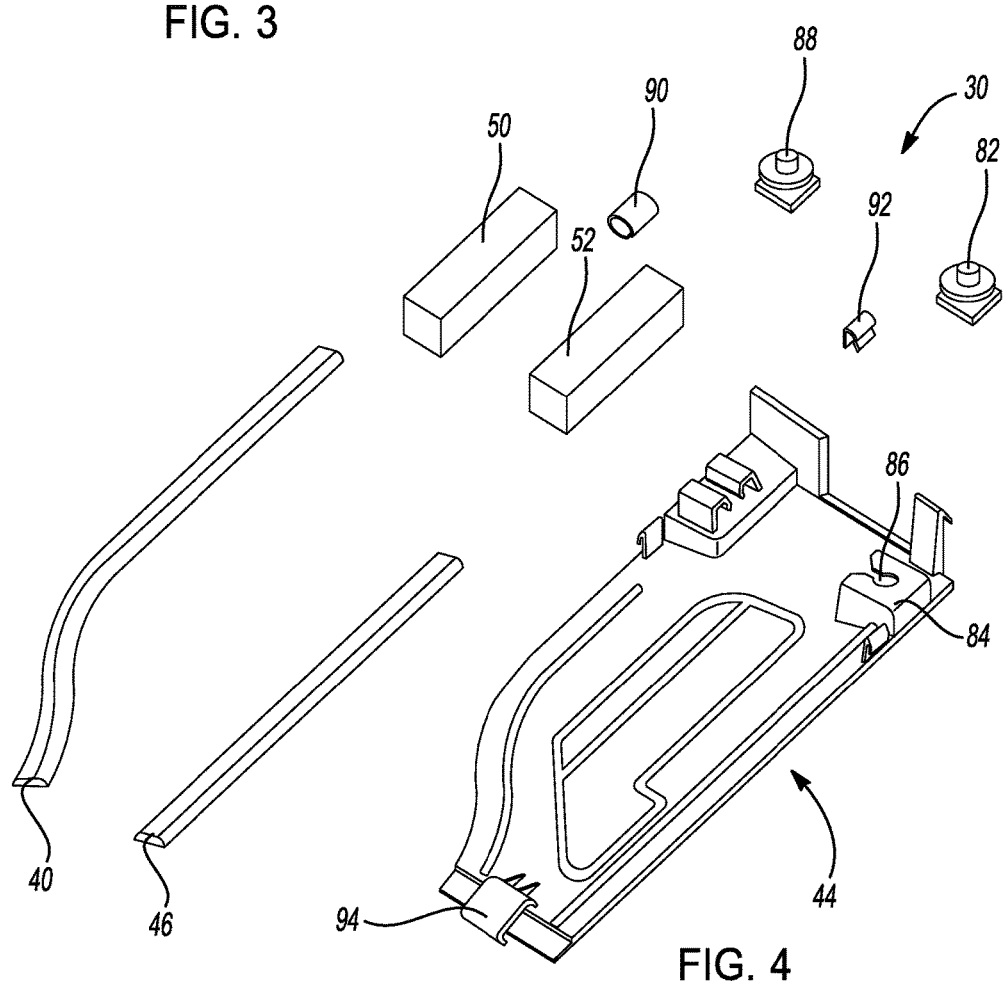
FIG. 4 is an exploded assembly view of a plate assembly of the detachable lift gate hinge cover assembly of FIG. 1.

Referring to FIG. 4 and again to FIGS. 1 through 3, various components of the plate assembly 30 are shown in exploded perspective view, including the first lip seal 40 and the second lip seal 46, which each can be provided of a resilient polymeric material which can be fixed to the panel 44 using an adhesive. The first anti-vibration foam pad 50 and the second anti-vibration foam pad 52 are each made of a resilient polymeric foam material to permit greater compressibility than a compressibility of the first and second lip seals 40, 46. The first anti-vibration foam pad 50 and the second anti-vibration foam pad 52 are both positioned between the first and second lip seals 40, 46, and as previously noted are fixed to the planar face 54 of the panel 44 using for example an adhesive. The male clip 82 such as a W-clip is frictionally engaged in the raised deck portion 84 of the panel 44 using a keyhole-shaped slot 86 created in the raised deck portion 84.

According to several aspects, a second clip 88 may be used in place of the female clip assembly 72, and installed in the same manner. First and second flock tapes 90, 92 may also be added to the first and second locating members 60, 62 to assist in retaining the first and second locating members 60, 62 and for noise and vibration reduction. A retention member 94 is integrally connected to the panel 44 at an end opposite to the location of the raised deck portion 84. The retention member 94 is used to releasably connect the plate assembly 30 to the bracket 33 as will be described in greater detail in reference to FIG. 7.

Referring to FIG. 5 and again to FIGS. 1 through 4, the rear trough portion 32 extending away from the elongated depression 26 is visible prior to installation of the plate assembly 30 having a portion of the coupling portion 34 of the bracket 33 visible. The rear trough portion 32 provides several features that assist in connecting and sealing the detachable lift gate hinge cover assembly 28 of the present disclosure. Apertures 96, 98 are provided in a planar plate section 100 which receive fasteners (not shown) used to mount the hinges of the rear lift gate 20. A first curved wall 102 of the rear trough portion 32 provides a sealing surface for the first lip seal 40, and an oppositely facing second curved wall 104 provides a sealing surface for the second lip seal 46. A raised male member 106 extending upwardly from the roof 14 within the trough portion 32 enters the receiving slot 80 of the female clip assembly 72 described in reference to FIG. 3 and is frictionally gripped by the first and second deflecting prongs 76, 78. An elongated aperture 108 receives the male clip 82 to provide an additional releasable, frictional engagement of the panel 44 to the roof 14.

Referring to FIG. 6 and again to FIGS. 1 through 5, the attachment member 114 of the bracket 33 of the detachable lift gate hinge cover assembly 28 may be fixed to the roof 14 within the elongated depression 26 and beneath the trim member 27 of the roof rack assembly 24 using one or more fasteners 110 inserted through apertures 112 provided in the attachment member 114. The attachment member 114 of the bracket 33 may further by connected for example using one or more fasteners to the trim member 27. The plate assembly 30 is shown after installation using the coupling portion 34 which is described in greater detail in reference to FIG. 7.

Referring to FIG. 7 and again to FIGS. 1 through 6, the bracket 33 includes the attachment member 114 having the coupling portion 34 integrally connected at one end. The coupling portion 34 includes a cavity 116 with a first contact member 118 and a second contact member 120 located within the cavity 116. The plate assembly 30 is releasably connected to the coupling portion 34 as follows. After initially rotating the plate assembly 30 in a rotation direction 122 with respect to the axis of rotation 38, a hook shaped end 124 of the retention member 94 is inserted through a clearance opening 126 between the first contact member 118 and the second contact member 120. The plate assembly 30 is then rotated in a rotation direction 128 opposite to the rotation direction 122 until in an installed position of the plate assembly 30 the retention member 94 directly contacts the second contact member 120, and an inner face 130 of the hook shaped end 124 directly abuts a first face 132 of the first contact member 118. The first face 132 is oriented substantially perpendicular to a second face 134 of the second contact member 120 which is also directly abutted by a flat edge 136 of a straight portion 138 of the retention member 94 in a retention or installed position of the plate assembly 30 shown. According to several aspects, the hook shaped end 124 of the retention member 94 is oriented substantially perpendicular to the straight portion 138, however the hook shaped end 124 can be oriented at any angle with respect to the straight portion 138 that provides a retention capability in the installed position. The abutting contact of the retention member 94 with each of the first face 132 and the second face 134 prevents the plate assembly 30 from being released in the release direction 36.

As the plate assembly 30 is rotated in the rotation direction 128, the first anti-vibration foam pad 50 and the second anti-vibration foam pad 52 directly contact a hinge bracket (not shown) seated on the planar plate section 100 and thereafter elastically compress, and the first and second cross-car locators 56, 58 frictionally contact the first curved wall 102 and the second curved wall 104. With continued rotation of the plate assembly 30 in the rotation direction 128, the male clip 82 enters and engages within the aperture 108, and the raised male member 106 is received in the receiving slot 80 of the female clip assembly 72 to retain the closed position of the plate assembly 30, and the first and second lip seals 40, 46 frictionally contact the first curved wall 102 and the second curved wall 104. The seals formed using frictional contact of the first and second lip seals 40, 46 with the first curved wall 102 and the second curved wall 104 thereafter minimize dirt and moisture entrance under the plate assembly 30, while allowing drainage in a front to rear flow path generally parallel with the release direction 36.

To release the plate assembly 30, the plate assembly 30 is rotated in the rotation direction 122 thereby releasing engagement of the male clip 82, releasing engagement of the raised male member 106 extending upwardly from within the receiving slot 80 of the female clip assembly 72, and releasing the frictional contact provided by the first and second cross-car locators 56, 58. Further rotation of the plate assembly 30 then allows the hook shaped end 124 of the retention member 94 to be displaced back outward through the clearance opening 126 opposite to the installation path described above.

A detachable lift gate hinge cover assembly 28 of the present disclosure offers several advantages. These include the ability to manufacture and ship a lift gate cover assembly together with a roof rail and rack system, while also providing the ability to rotate the hinge cover assembly for detachment and replacement. This permits access to lift gate hinge bolts without the need to remove the roof rail assembly for service.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A detachable lift gate hinge cover assembly, comprising:
    a bracket positioned within an elongated depression formed in a roof of an automobile vehicle and fixed to the roof within the elongated depression and to a trim member positioned outside of the elongated depression;
    the bracket includes an attachment member having an integrally connected coupling portion, the coupling portion including a clearance opening; and
    a plate assembly releasably connected to the bracket, the plate assembly when positioned in an installed position is within and covers a lift gate hinge pocket located rear of the elongated depression, the plate assembly including a panel having a retention member integrally connected to the panel, the plate assembly when rotated in a first direction of rotation aligning the retention member with the clearance opening of the coupling portion for insertion and removal of the retention member through the clearance opening allowing both connection and disconnection of the plate assembly with the bracket.

2. The detachable lift gate hinge cover assembly of claim 1, wherein the coupling portion of the bracket further includes a first contact member and a second contact member located within a cavity of the coupling portion.

3. The detachable lift gate hinge cover assembly of claim 2, wherein:
    the retention member includes a hook shaped end directly contacting the second contact member with the retention member also contacting the first contact member defining the installed position of the plate assembly; and
    an inner face of the hook shaped end directly abuts a first face of the first contact member in the installed position of the plate assembly.

4. The detachable lift gate hinge cover assembly of claim 3, wherein:
    the hook shaped end of the retention member is oriented substantially perpendicular to a straight portion of the retention member; and
    the first face is oriented substantially perpendicular to a second face of the second contact member, the second face also directly abutted by a flat edge of a straight portion of the retention member in the installed position of the plate assembly.

5. The detachable lift gate hinge cover assembly of claim 2, wherein when the plate assembly is in the installed position, the retention member contacts the second contact member and the first contact member.

6. The detachable lift gate hinge cover assembly of claim 2, wherein the retention member includes a straight portion with a flat edge, and when the plate assembly is in the installed position the second contact member directly abuts the flat edge.

7. The detachable lift gate hinge cover assembly of claim 1, wherein the plate assembly includes a panel having:
    a male clip engaged within an aperture of the roof in an installed position of the plate assembly; and
    a female clip assembly having a receiving slot capturing a male member extending from the roof in the installed position of the plate assembly.

8. The detachable lift gate hinge cover assembly of claim 1, wherein the plate assembly includes a panel having:
    first and second lip seals connected to opposed outer edges of the panel; and
    at least one anti-vibration foam pad fixed to a planar face of the panel; and
    wherein in an installed position of the panel within the lift gate hinge pocket the first lip seal directly contacts a first curved wall of the roof within the trough, and the second lip seal directly contacts an oppositely facing second curved wall of the roof within the trough, with the at least one anti-vibration foam pad positioned between a planar plate section of the roof within the trough and the plate assembly.

9. The detachable lift gate hinge cover assembly of claim 1, wherein the trim member defines a molding at least partially covering the elongated depression.

10. The detachable lift gate hinge cover assembly of claim 1, wherein the trim member defines an end portion of a roof rail.

11. A detachable lift gate hinge cover assembly, comprising:
- a bracket fixed to a roof of an automobile vehicle, the bracket including an attachment member having an integrally connected coupling portion;
- a plate assembly including a panel having a retention member integrally connected to the panel, the plate assembly when rotated in a first direction of rotation aligning the retention member with a clearance opening of the coupling portion allowing insertion of the retention member through the clearance opening of the coupling portion to releasably engage a hook shaped end of the retention member with the coupling portion;
- the plate assembly when positioned in an installed position within a roof hinge pocket of the roof at least partially covering a lift gate hinge attachment area; and
- the plate assembly when rotated in a second direction of rotation opposite to the first direction of rotation releasing the hook shaped end from the coupling portion to release the plate assembly from the installed position.

12. The detachable lift gate hinge cover assembly of claim 11, wherein the plate assembly includes a male clip engaged within an aperture of the roof in the installed position of the plate assembly.

13. The detachable lift gate hinge cover assembly of claim 11, wherein the plate assembly includes a female clip assembly having a first locating, minimally deflecting prong and an opposed second maximally deflecting prong defining a receiving slot therebetween, the receiving slot capturing a male member extending from the roof to retain the plate assembly in the installed position.

14. The detachable lift gate hinge cover assembly of claim 11, wherein the plate assembly includes cross-car first and second locating members oppositely facing with respect to each other, the cross-car first and second locating members elastically deflecting to frictionally contact opposed walls of the roof hinge pocket of the roof, thereby providing side-to-side alignment of the plate assembly in opposed directions and to provide position retention of the plate assembly within the roof hinge pocket.

15. The detachable lift gate hinge cover assembly of claim 14, wherein the plate assembly includes a molded clip integrally connected to the plate assembly having a third locating member oriented perpendicular to an orientation of both the first and second locating members.

16. The detachable lift gate hinge cover assembly of claim 11, wherein the bracket when fixed to the roof of the automobile vehicle is positioned substantially underneath a portion of a roof rack assembly.

17. The detachable lift gate hinge cover assembly of claim 16, wherein the bracket is fixed to the roof using at least one fastener extending through an aperture created in the bracket.

18. A detachable lift gate hinge cover assembly, comprising:
- a bracket fixed to a roof of an automobile vehicle and positioned substantially underneath a portion of a roof rack assembly, the bracket including an attachment member having an integrally connected coupling portion and a clearance opening;
- a plate assembly including a retention member with a hook shaped end, the plate assembly when rotated in a first direction of rotation aligning the retention member with the clearance opening of the coupling portion allowing insertion of the retention member through the clearance opening to releasably engage the hook shaped end of the retention member with the coupling portion;
- the plate assembly after rotation in the first direction of rotation positioned in an installed position within a roof hinge pocket of the roof and at least partially covering a lift gate hinge attachment area; and
- the plate assembly when rotated in a second direction of rotation opposite to the first direction of rotation releasing the hook shaped end from the coupling portion to release the plate assembly from the installed position.

19. The detachable lift gate hinge cover assembly of claim 18, wherein the plate assembly includes a panel having:
- a male clip engaged within an aperture of the roof in the installed position of the plate assembly;
- a female clip assembly having a receiving slot capturing a male member extending from the roof in the installed position of the plate assembly; and
- opposed cross-car first and second locating members elastically deflecting to frictionally contact opposed walls of the roof hinge pocket in the installed position of the plate assembly.

20. The detachable lift gate hinge cover assembly of claim 18, wherein when the hook shaped end of the retention member is engaged with the coupling portion the plate assembly is rotatable about an axis of rotation with respect to the bracket.

* * * * *